US010757139B1

(12) United States Patent
Cignetti et al.

(10) Patent No.: US 10,757,139 B1
(45) Date of Patent: Aug. 25, 2020

(54) ASSESSING AND REPORTING SECURITY RISKS OF AN APPLICATION PROGRAM INTERFACE

(71) Applicant: Amazon Technologies, Inc., Seattle, WA (US)

(72) Inventors: Todd Lawrence Cignetti, Ashburn, VA (US); Robert Eric Fitzgerald, Herndon, VA (US); Eric Wayne Schultze, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 15/195,957

(22) Filed: Jun. 28, 2016

(51) Int. Cl.
*H04L 29/06* (2006.01)

(52) U.S. Cl.
CPC .......... *H04L 63/20* (2013.01); *H04L 63/0428* (2013.01); *H04L 63/10* (2013.01); *H04L 63/1433* (2013.01)

(58) Field of Classification Search
CPC ..... H04L 63/20; H04L 63/0428; H04L 63/10; H04L 63/1433
USPC ........................................................... 726/1
See application file for complete search history.

(56) References Cited

U.S. PATENT DOCUMENTS

| 2008/0082662 | A1* | 4/2008 | Dandliker | ............... | H04L 63/10 709/225 |
| 2011/0246504 | A1* | 10/2011 | Slater | ..................... | G06Q 10/00 707/769 |
| 2012/0290399 | A1* | 11/2012 | England | ............. | G06Q 30/0282 705/14.66 |
| 2013/0227636 | A1* | 8/2013 | Bettini | .................. | H04W 12/12 726/1 |
| 2013/0227683 | A1* | 8/2013 | Bettini | .................... | G06F 21/57 726/22 |
| 2014/0280961 | A1* | 9/2014 | Martinez | ............. | H04L 41/5054 709/226 |
| 2016/0034260 | A1* | 2/2016 | Ristock | .................... | G06F 8/34 717/109 |
| 2016/0098564 | A1* | 4/2016 | Wysopal | ............. | G06F 11/3612 726/25 |
| 2016/0248797 | A1* | 8/2016 | Yampolskiy | ........ | H04L 63/1433 |

(Continued)

OTHER PUBLICATIONS

"Deliver Better APIs: The Analytics Platform for APIs, Micorservices and Serverless Software," Mashape Inc, © 2017, <https://getgalileo.oi/> [retrieved Jun. 20, 2017], 4 pages.

(Continued)

*Primary Examiner* — Andrew J Steinle
*Assistant Examiner* — Sakinah White Taylor
(74) *Attorney, Agent, or Firm* — Davis Wright Tremaine LLP

(57) ABSTRACT

A security service of a computing resource service provider provides security scores for application program interfaces (APIs) and other security information to an API marketplace or other endpoints. The security score may be based at least in part on component information associated with computing resources implementing the API. The security service may obtain access to the computing resources and collect various components from the computing resources. The components may then be used to determine a security score of an API offered from consumption on the API marketplace. The security service may then publish the security score to the API marketplace or other endpoint.

23 Claims, 7 Drawing Sheets

(56) References Cited

U.S. PATENT DOCUMENTS

2017/0064038 A1\*  3/2017  Chen .................... G06F 16/951
2018/0027006 A1\*  1/2018  Zimmermann ..... H04L 63/1425

OTHER PUBLICATIONS

"Secure, Manage and Extend Microservices and Serveless APIs," Mashape Inc, © 2017, <https://mashape.com/> [retrieved Jun. 20, 2017], 6 pages.

Daigle, L. "WHOIS Protocol Specification," Request for Comments: 3912, Standards Track, Sep. 2004, 4 pages.

\* cited by examiner

ASSESSING AND REPORTING SECURITY RISKS OF AN APPLICATION PROGRAM INTERFACE

BACKGROUND

Customers of computing resource service providers may be provided with a wide range of choices with regard to the computing resources that may be selected and utilized by the customer as well as how these computing resources are set up and utilized. Furthermore, customers may utilize these computing resources to develop and implement a variety of applications including web services or other applications accessible over a network connection. Depending on how the computing resources are set up and utilized, customers may experience different levels of performance and security of these computing resources. As described above, these resources may be provided and managed in the form of services such as data storage services or web services built on top of services and computing resources provided by the computing resource service provider. Many data storage services, web services, and/or computing services offer many different resource usage and/or allocations as well as different security configurations. For example, a web service may be distributed, may be virtual, may provide different types of encryption, and/or may provide various security options.

In addition, software development, including web application development, has greatly increased in recent years. Organizations increasingly develop multiple applications in order to support a variety of different hardware platforms with different capabilities and features. These organizations may include customers of the computing resource service provider. Furthermore, the applications may be provided to other customers and organizations through an application program interface (API). Due to the vast number of different security and computing resource configurations, it may be difficult for consumers of these APIs to determine the risks associated with using these APIs (e.g., incorporating an API into a web application developed by a particular customer). Additionally, these APIs may not be configured to ensure the security of other applications utilizing the APIs.

BRIEF DESCRIPTION OF THE DRAWINGS

Various techniques will be described with reference to the drawings, in which.

DETAILED DESCRIPTION

Figure 1:
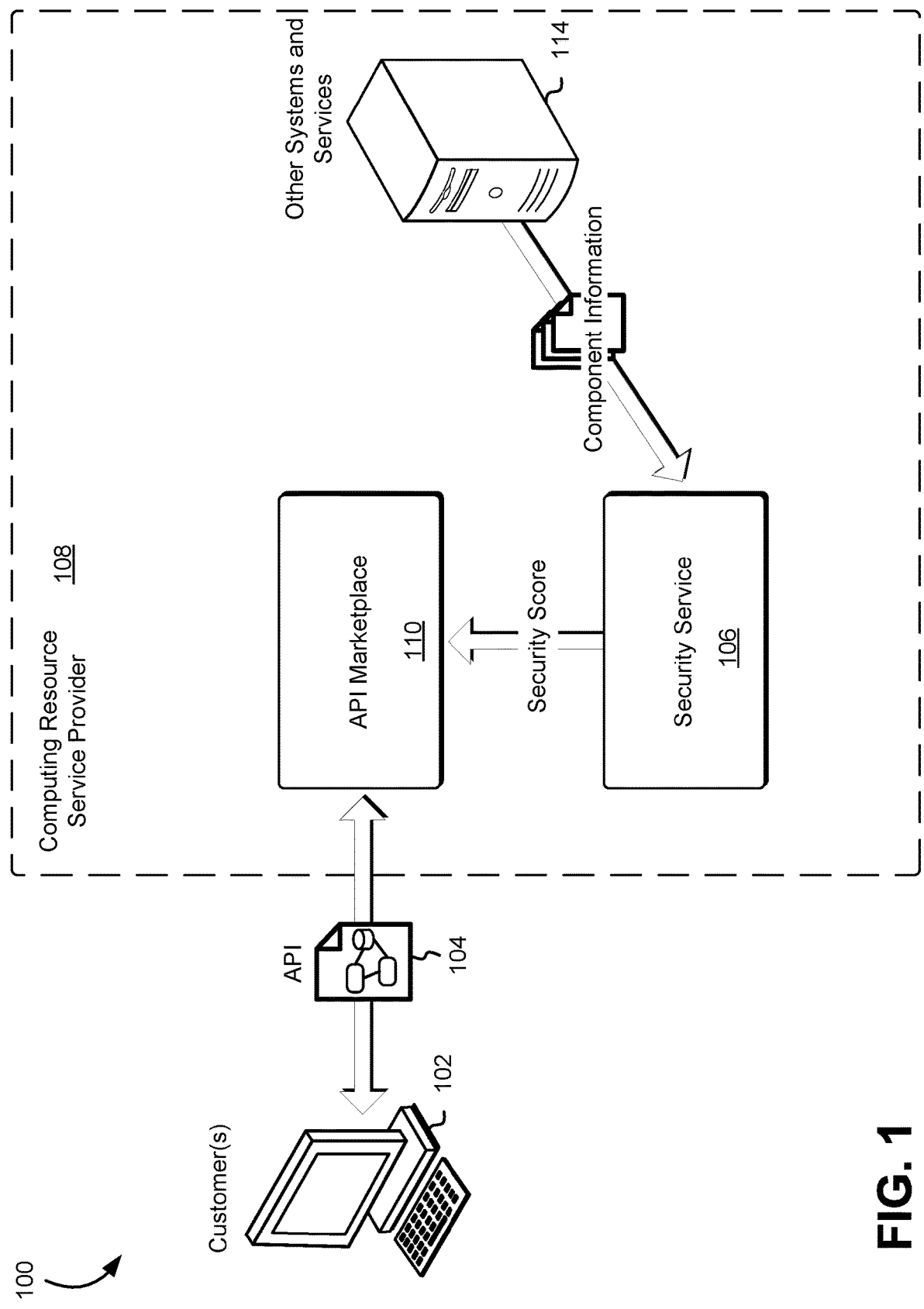
FIG. 1 illustrates an example environment in which a security score for an API may be generated by a security service and provided to customers in accordance with an embodiment.

In various examples described below, a computing resource service provider provides customers with access to various computing resources to execute and/or operate various applications on behalf of the customer. For example, customers may be provided with access to a virtual computer system service. The virtual computer system service may provide customers with access to on-demand computing resources such as virtual machines instances or similar host computer systems. The customer may use these virtual machine instances to execute the applications on behalf of the customer. Furthermore, the customer may utilize additional computing resources operated by the computing resource service provider, the customer, or other entity to implement the customer's application. For example, the customer may utilize virtual machine instances and a database operated by the computing resource service provider, a web server operated by the customer, and additional storage devices operated by a separate entity to execute a particular application on behalf of the customer.

In addition, these customer applications may be exposed or interacted with through various API calls. For example, the customer may expose a set of public API calls allowing other customers or entities to interact with and access the applications implemented by the customer. Furthermore, these APIs may be distributed through an API marketplace or API store. The API marketplace may enable customers and other entities to obtain and utilize API in their own applications and web services. For example, a first customer may utilize computing resources of the computing resource service provider to implement a calendaring application. The first customer may provide access to the calendaring application by providing APIs associated with the calendaring application to an API marketplace (provided by the computing resource service provider or other entity). A second customer may implement a messaging application utilizing computing resources operated by the second customer. The second customer may then utilize the calendaring application in the messaging application by obtaining the calendaring application API through the API marketplace. However, it may be difficult to assess security risks associated with utilizing the calendaring application API. Therefore it may be advantageous for the computing resource service provider to determine a security score associated with the different APIs in order to provide this information to customers.

A security service, described in greater detail below, may collect information associated with various APIs and determine a security score associated with the API. In addition, the security service may publish these security scores to a variety of end points such as the API marketplace, webpages, a management console, directly to the customer, or a variety of other end points. The security service may collect a variety of different components that are used in determining a security score. The components may include, for example, results of a penetration test, results of a network scan, whois information, secure sockets layer information, transport layer security, customer reviews, automated code analysis, or any other component that may affect the security on an API. The security service collects these components by accessing the APIs and computing resources executing the applications associated with the APIs. Once the components of the security score are collected, a security score for a particular API may be determined and published to various endpoints as described in greater detail below. Historical information may be maintained by the security service and provided to customers as well as notifications, updates, and other information associated with the security scores for various APIs.

In the preceding and following descriptions, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which a computing resource service provider 108 operates an API marketplace 110 which includes security score information for various APIs provided by the API marketplace 110 in accordance with an embodiment. A security service 106 may be responsible for collecting information associated with the APIs 104 provided by the API marketplace and generating security score information corresponding to the APIs 104. Customers 102 of the computing resource service provider 108 may include developers and/or consumers of the APIs 104 on the API marketplace 110. In yet other embodiments, the customers 102 are customers of developers or vendors of the APIs 104 and may not be customers 102 of the computing resource service provider 108. The computing resource service provider 108 may be an organization or entity that provides customers 102 with access to various computer systems and services operated by the computing resource service provider 108. For example, as illustrated in FIG. 1, the computing resource service provider 108 may operate the API marketplace and provided customers 102 with access to APIs 104 developed by the computing resource service provider 108 or other entities. In yet other embodiments, the API marketplace 110 may be provided by a third party not illustrated in FIG. 1, the third party may utilize computing resources or services of the computing resource service provider 108 to implement at least a portion of the API marketplace 110. For example, the third party may utilize the security service 106 to provide security scores for APIs 104 on the API marketplace 110. The API marketplace 110 may include a computer system that makes accessible APIs for selection, download, viewing, and other forms of consumption of APIs.

The computing resource service provider 108 may also operate one or more other systems and services 114. For example, the computing resource service provider 108 may provide an on-demand data storage service, virtual computer system service, load balancing service, auto-scale service, cryptography service, notification service, authentication system, policy management service, task service, or various other services suitable for providing customers 102 with resources to consumer and/or develop APIs 104. It is noted that not all embodiments described herein include the other systems and services 114 described with reference to FIG. 1, and additional services may be provided in addition to or as an alternative to services explicitly described herein. As described herein, each of the other systems and services 114 may include one or more web service interfaces that enable the customer 102 to submit appropriately configured API calls to the various services through web service requests. In addition, each of the other systems and services 114 may include one or more service interfaces that enable the services to access each other (e.g., to enable a virtual computer system of the virtual computer system service to store data in or retrieve data from the on-demand data storage service and/or to access one or more block-level data storage devices provided by the block level data storage service).

The customers 102 may utilize the other systems and services 114 described herein to provide a platform for developing, operating, and/or distributing the APIs 104. For example, the customer 102 may utilize virtual computer systems provided by the virtual computer system service of the computing resource service provider 108 to operate a web server executing various operations of a particular API. In still other embodiments, the customer 102 may use computing resources operated by the customer 102 or other entity (e.g., a third party not illustrated in FIG. 1) to implement all or a portion of the operations of a particular API. The customer 102 may use a combination of computing resources operated by various entities to implement the particular API.

Figure 2:
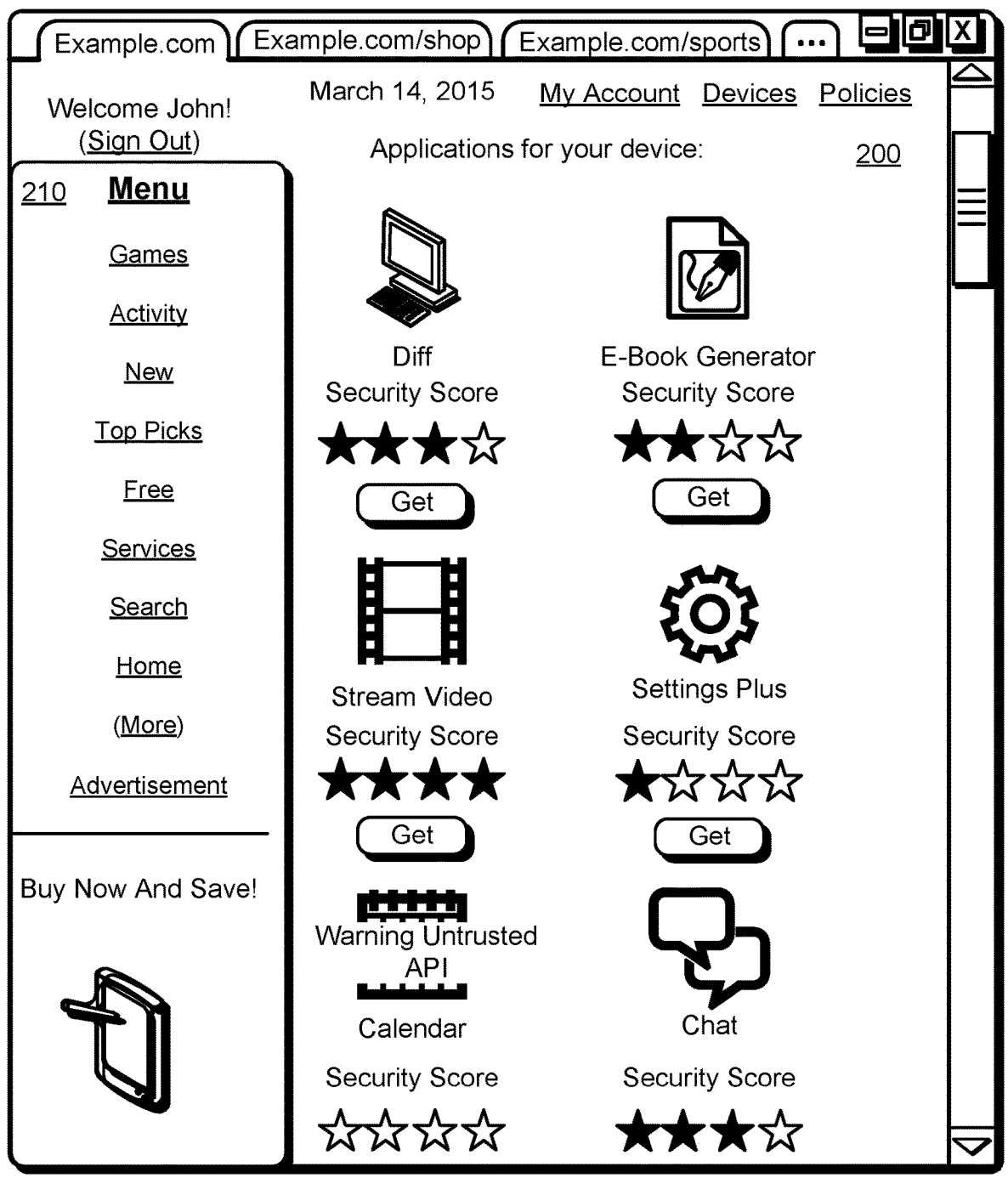
FIG. 2 is an illustrative example of a webpage for displaying a security score for an API in accordance with at least one embodiment.
Figure 3:
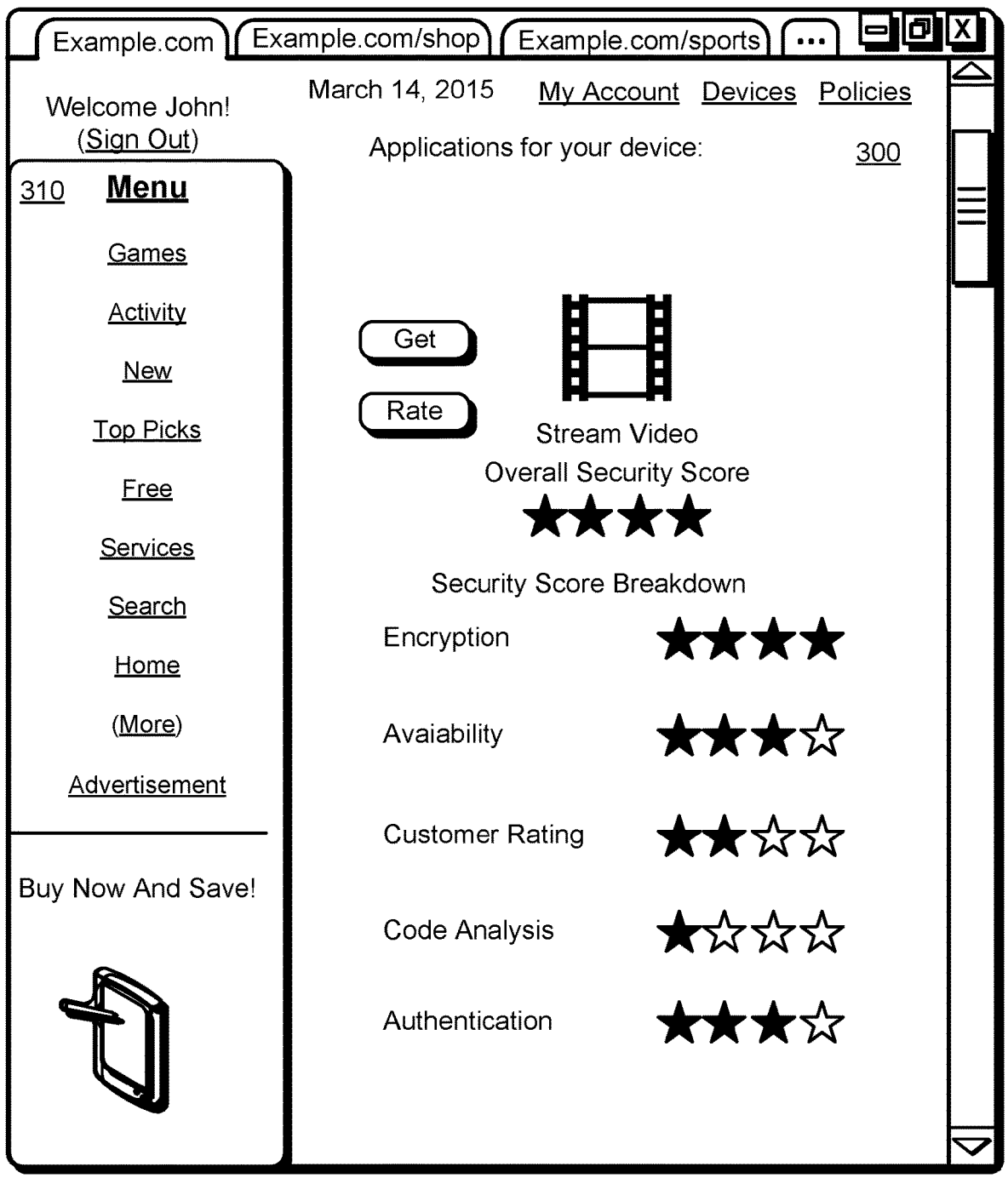
FIG. 3 is an illustrative example of a webpage for displaying a security score for an API in accordance with at least one embodiment.

The API marketplace 110, as described above, enables the customer 102 to obtain and/or consume APIs 104. In addition, the API marketplace 110 may allow the customer 102 to provide the API marketplace 110 with APIs 104 to make available on the API marketplace 110. As illustrated in FIGS. 2 and 3 below, the API marketplace 110 may provide the customer 102 with a user interface through which the customer 102 may obtain information associated with the APIs 104 such as a security score. The security score, described in greater detail below, may be generated by the security service 106 and may indicate to the customer 102 the overall security of a particular API. The security score may provide the customer 102 with an approximation or overview of various security features and/or security of operations performed by the particular API. The security score may be a mechanism for conveying information to the customer 102 in a form that is easy to understand and conveys information associated with various features and/or attributes of the APIs 104. As described in greater detail below, the security score may be based at least in part on a variety of components.

The security service 106 collects and publishes information associated with the APIs 104. The security service 106 may include virtual computing resources, physical computing resources, or a combination thereof. For example, the security service 106 may be implemented by one or more virtual computer systems executing instructions of the security service 106. Furthermore, the computing resources used to implement the security service 106 may be operated and/or provided by the computing resource service provider 108. Returning to the example above, the virtual computer systems may be provided by the virtual computer system service. As another example, the security service 106 may store security data, such as components of the security score and historical information, on storage resources provided by the on-demand storage service as described above.

The security service 106 obtains component information from the computing resources implementing the other computer systems and services 114. In various embodiments, the developer of a particular API provides the security service 106 with access to the component information and/or the other computer systems and services 114. The component information may include information obtained directly from the other computer systems and services 114 and/or information obtained as a result of an operation performed by the other computer systems and services 114. For example, the component information includes configuration information of the other computer systems and services 114, such as application settings, operating system settings, security setting, or other configuration settings of the other computer systems and services 114. In another example, the component information includes results of operations performed by the other computer systems and services 114 such as a network penetration test, SSL connection, computational operations, or other operations of the other computer systems and services 114. The component information may also include information associated with the other computer systems and services 114. For example, the component information includes logs, network traffic flow information, or other information indicating operations performed by the other computer systems and services 114. The network traffic flow information may include information such as a source of network traffic, a destination of network traffic, a service associated with network traffic, a causes of network congestion, or other information associated with the flow of data across various networks.

The security service 106 may periodically or aperiodically collect the component information and determine a security score based at least in part on the component information. For example, the security service 106 may collect component information for a seven-day interval and determine a security score based at least in part on the component information collected over the seven-day interval. In another example, the security service 106 may collect component information as a result of a trigger. The trigger may include an event such as the addition of an API or version of an API to the marketplace, an update to a security policy, deprecation of a security algorithm, or other event that may modify or otherwise affect the security score on an API.

In addition to collecting component information, the security service 106 may be responsible for determining the security score. The security score may be calculated based at least in part on one or more components. Different components may be weighted or otherwise modified to have a greater or lesser influence on the security score. For example, the length of cryptographic keys used by a particular API may be weighted higher (e.g., increase the security score by a greater amount) than the particular encryption algorithm or type of encryption algorithm used. The security score may be a composite score of the various components collected by the security service 106. In addition, only a portion of the components obtained by the security service 106 may be used in calculating the security score or different portions of the components collected by the security service 106 may be used to calculate a plurality of different security scores. For example, a portion of the components may be labeled as "experimental" and may be included in a separate security score.

The security service 106 may, once determined, publish or otherwise provide the security score to the API marketplace 110. The API marketplace 110 may be presented as a web page to the customer 102. The security score may be included as a graphical user interface element in the webpage as described in greater detail below. In various embodiments, the customer 102 may be provided with notification corresponding to the security score for a particular API. For example, the customer 102 may be provided with an updated security score as a result of a security score changing for a particular API which the customer 102 has obtained from the API marketplace 110. In yet other embodiments, developers are provided with a security score for APIs submitted by the developer to the API marketplace 110. In addition, if the security score for a particular API changes (e.g., as a result of an update to a security policy of the API marketplace 110), a notification may be transmitted to the developer indicating the security score and a reason for the change in the security score.

In addition, the developer may be provided with recommended actions for any security score or other finding generated by the security service. The recommended actions may include a variety of actions that the developer of the particular API may take to increase the security score for the particular API, such as modifications to the configuration of the particular API, modifications to the configuration of the computing resources implementing the API, adding or modifying encryption settings, adding or modifying authentication settings, or other actions that may have an effect on the security score of a particular API. The security service 106 may allow the developer of a particular API to define an amount of security information associated with the security score that is displayed on the API marketplace 110. As described in greater detail below, the security score may include a composite score and the developer may select a level of detail or other information to be displayed by the API marketplace 110. For example, the developer may select the security score to be displayed as a letter grade (e.g., A, B, C, etc.), a percentage, a composite score plus a score for individual components of the composite score, metrics from various components, a combination of letter grades and percentages, or any other mechanisms or combination of mechanisms to display the security score. In addition, the developer of a particular API may cause the API marketplace 110 to distribute the security score and information associated to the security score to various endpoints. For example, the API marketplace 110 may distribute the security score, via e-mail or other delivery method, to a distribution list including destinations internal to the developer, public parties, and/or trusted third parties.

FIG. 2 shows a webpage 200 which may be displayed by an application executed by a computing device enabling a user to purchase or otherwise obtain one or more APIs, where the one or more APIs are assigned a security score corresponding to the APIs. As illustrated in FIG. 2, the webpage 200 includes various graphical user interface elements that enable navigation throughout an API marketplace of which the webpage 200 is a part. In various embodiments, the webpage 200 is implemented by a computing resource service provider and the computing resource service provider is responsible for receiving user input into the webpage 200 and transmitting the received input to various other services of the computing resource service provider configured to provide the API and associated security score to the computing device operated by the user. For example, as described in greater detail below, the user's input may cause the service provider to enable the computing device to obtain access to the API and computing resources implementing the API.

The webpage 200 may be displayed by various applications, such as a mobile application or web browser. In this example, the webpage 200 includes various navigational features. For instance, on the left-hand side of the webpage 200, various links 210 may link to one or more other webpages that contain additional content corresponding to the API marketplace. In this example, the links appear as textual words which enable the links to be selected using an appropriate input device such as a keyboard, mouse, touchscreen or other input device. Selection of one of the links 210 may cause an application displaying the webpage 200 to submit, pursuant to a uniform resource locator (URL) associated with the selected link by the programming of the webpage 200, an HTTP request for the content associated with the link to a server that provided the webpage 200 or another server. In this example, the webpage 200 also includes a graphical user element configured as a "get" button. The get button may be a graphical user interface element of the webpage 200 where the underlying code of the webpage 200 is configured such that selection by an input device of the get button causes information corresponding to the selection to be transmitted to one or more servers or services of the computing resource service provider.

The webpage 200 may also include a description of the APIs and/or other information associated with the APIs displayed in webpage 200. The description may provide information to the customer, including a particular level of security or security score associated with the APIs. The service provider may transmit a notification indicating the security score of the API to an electronic address of the developer, such as an Internet Protocol (IP) address, electronic mail address, endpoint registered with a notification service, or other mechanisms for distributing the security score. The developer of the API may then update the application implementing the API such that the API no longer violates the security policy. In various embodiments, the update to the API causes the security service to collect updated information associated with the API and determine a new security score. In this example, the webpage 200 contains six APIs that the customer may include in the customer's own applications. The APIs may be provided by a developer, by the service provider, or any other party capable of listing APIs to the webpage 200.

Furthermore, the APIs displayed in the webpage 200 may correspond to services offered by the computing resource service provider or one or more other organizations. For example, the APIs may enable access to services include a messaging service, content delivery service, or other service. The APIs displayed on the webpage 200 may contain a presentation of the APIs such as a graphical representation of the service or application associated with the API, which could be text and/or a drawing, photograph, description, identification number, trademark, video clip, audio clip, or any other representation or combination of representations capable of representing the items. Other variations of the user interface displayed in FIG. 2 may be used in accordance with the present disclosure. For example, drop-down menus may be included in the user interface to enable the user to select a particular user account or information associated with a developer account to include when providing an API to the API marketplace.

FIG. 3 shows a webpage 300 which may be displayed by an application executed by a client device enabling a user to view various components and/or aspects of a security score for a particular API. As illustrated in FIG. 3, the webpage 300 includes various graphical user interface elements that enable navigation throughout an API marketplace of which the webpage 300 is a part. In various embodiments, the webpage 300 is implemented by a computing resource service provider and the computing resource service provider is responsible for receiving user input into the webpage 300 and transmitting the received input to various other services of the computing resource service provider, such as the API marketplace. The API marketplace provides the APIs, as described above, and a security score, components of the security score, and other information associated with security of an API to the client device of the user in response to input received from the client device. For example, as described in greater detail below, the user's input may cause the computing resource service provider to enable the user's client device to register or sign up with the developer of the API and access computing resources implementing the API by incorporating the API in an application implemented by the user. The webpage 300 may be displayed by various applications, such as a standalone application or web browser. In this example, the webpage 300 includes various navigational features.

For instance, on the left-hand side of the webpage 300, various links 310 may link to one or more other webpages that contain additional content corresponding to the API marketplace. In this example, the links appear as textual words which enable the links to be selected using an appropriate input device such as a keyboard, mouse, touchscreen or other input device. Selection of one of the links 310 may cause an application displaying the webpage 300 to submit, pursuant to a uniform resource locator (URL) associated with the selected link by the programming of the webpage 300, an HTTP request for the content associated with the link to a server that provided the webpage 300 or another server. In this example, the webpage 300 also includes a graphical user element configured as a "get" button. The get button may be a graphical user interface element of the webpage 300 where the underlying code of the webpage 300 is configured such that selection by an input device of the get button causes information corresponding to the selection to be transmitted to one or more servers of the computing resource service provider.

The webpage 300 may also include a description of the API and/or other information associated with the API displayed in webpage 300. The description may provide information to the customer, including a security score for a particular API and various components used to determine the security score. As illustrated in FIG. 3, the information displayed in webpage 300 includes a breakdown of the security score. The breakdown may include various components used by the security service to determine the security score as described above. The components of the security score displayed in FIG. 3 include encryption, availability, customer rating, code analysis, and authentication. The components displayed in the webpage 300 may include all or a portion of the components used to determine the security score. Each component of the security score may have a value or score assigned to it based at least in part on information associated with the API. For example, the use of various encryption algorithms, key lengths, or other security features to encrypt or otherwise protect information and transmissions of the API may be assigned different values. In addition, multiple components may be combined into a single category with a single score. Returning to the example above, the encryption algorithm, key, length, and other security features may be combined into a single value, such as the encryption value illustrated in webpage 300. In addition, a single value for multiple categories may be combined into a single security score or single component of the security score associated with the API.

In this example, the webpage 300 also includes a graphical user element configured as a "rate" button. The rate button may be a graphical user interface element of the webpage 300 where the underlying code of the webpage 300 is configured such that selection by an input device of the rate button causes information corresponding to the selection to be transmitted to one or more servers of the computing resource service provider. For example, selection of the rate button may cause the underlying code of the webpage 300 to navigate to a page which enables the user to rate the API displayed in webpage 300. The service provider may transmit a notification indicating the rating of the API to an electronic address of the developer, such as an Internet Protocol (IP) address or electronic mail address. The ratings may be included in the security score. Furthermore, the rating may be filtered or otherwise pruned to avoid skewing the security score.

Furthermore, the API displayed in the webpage 300 may correspond to services offered by the computing resource service provider or one or more other organizations. For example, the services may include a messaging, delivery service or other service. The API displayed on the webpage 300 may contain a presentation of the API such as a graphical representation of the service or operation associated with the application, which could be text and/or a drawing, photograph, description, identification number, trademark, video clip, audio clip or any other representation capable of representing the items. Other variations of the user interface displayed in FIG. 3 may be used in accordance with the present disclosure. For example, drop-down menus may be included in the user interface to enable the user to select a particular user account or information associated with a customer account to include when provisioning new mobile devices.

Figure 4:
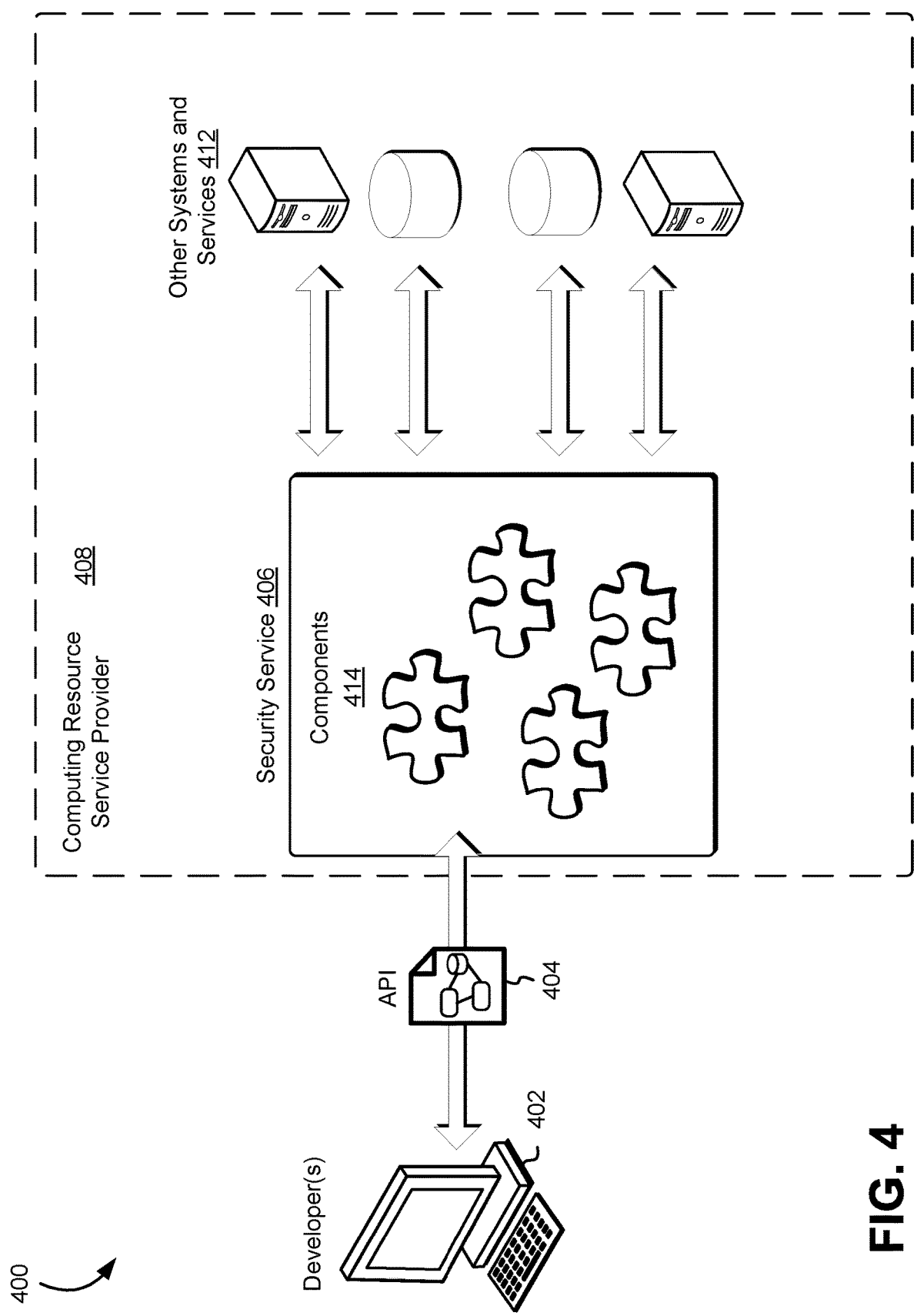
FIG. 4 illustrates an example environment in which components of a security score for an API may be collected by a security service and provided to customers in accordance with an embodiment.

FIG. 4 illustrates an environment 400 in which a security service 406 may obtain one or more components 414 of a security score from one or more other computer systems or services 412 in accordance with an embodiment. A developer 402 may provide an API 404 to other developers, customer, or other entities. The developer 402 may utilize computing resources of a computing resource service provider 408 to implement all or a portion of the API 404. For example, the developer 402 may utilize a virtual computer system service of the computing resource service provider 408 to cause a set of virtual computer systems to execute the API 404. Although the other systems and services 412 are illustrated in FIG. 4 as within the computing resource service provider 408 environment, the other systems and services 412 may be distributed between a plurality of computing environments or may be located in a computing environment distinct from the computing resource service provider 408 environment (e.g., developer operated data center). The API 404 may include any API and may be available on an API marketplace as described above. The API 404 may be listed for sale on the API marketplace or the API marketplace may be a proxy for the API endpoint.

The other systems and services 412 may include a variety of computer systems and services as described above. In addition, the security service 406 may collect components 414 from the other systems and services 412. The security service 406 may obtain access to the other systems and services 412 from the developer 402 in order to obtain the components 414. For example, the developer 402 may assign a role to the security service 406 to enable the security service to communicate with the other systems and services 412 and obtain the components 414. In another example, the developer may provide the security service 406 with credentials to enable the security service 406 to authenticate to the other systems and services 412 and obtain the components 414. In various embodiments, the developer 402 is required to provide the security service with access to the other systems and services 412 in order to obtain a security score for the API 404 or as a result of making the security score of the API 404 available on the API marketplace.

The other systems and services 412 may include a container service (not illustrated in FIG. 4 for simplicity) of a computing resource service provider 408. A scheduler may determine which container instance of a cluster of container instances is to provide the components 414 and fulfil the request. In some embodiments, a single container instance may be instantiated per action or operation of the requests. Alternatively, the computing resource service provider 408 may provide a fleet or cluster of container instances to perform one or more actions and/or operations. The cluster of container instances may include multiple Internet Protocol (IP) addresses and a Network address translation (NAT) gateway configured to route traffic to the IP addresses.

In some examples, a "task definition" or "task definition file" may refer to a file specifying a set of linked containers (i.e., a set of containers that, when running on a host computing system, are associated with each other) that are assigned to start as a group. The task definition may further specify disk and network locations that the software functions are able to share on a single physical machine. The task definition may then be utilized for launching the set of container instances. In some implementations, the task definition may define and link software functions spread across multiple physical machines. One task definition may contain and schedule many tasks. In some examples, a "task" may refer to an instantiation of a patch workflow, and may consist of one or more software functions. Tasks may be modified by applying a new task definition to the task.

Requests for container instances may contain all the information needed to place software functions in container instances of a cluster, and the cluster may be managed through application programming interface calls. This information may be provided as parameters to the requests. An example task definition specifies that one or more tasks with a given name have a software image located at a particular patch. Furthermore, the task definition may allocate processing capacity, memory, IP address, port, and other computing resources to particular tasks of the one or more tasks. Similarly, the task definition may also specify storage locations for data objects to be processed, and data objects that may be created as a result of execution of the software functions. In various embodiments, the task definition indicates an interaction between tasks and/or software functions.

The components 414 may include any information associated with the API 404 and the computing resources implementing the API include the computing resources of the other systems and services 412 which may be supporting or indirectly implementing the API 404. For example, the components 414 may include requirements for using SSL and TLS, parameters used for terminating SSL and TLS including the cypher types, key sizes, data protection, authorization and authentication requirements from using the API 404, Domain Name System (DNS) security, availability, network information, logs, historical data, a result of analyzing code associated with the API 404, and any other information associated with the security of the API 404. Furthermore, the components 414 may include a result or other information obtained from interacting with the other systems and services 412. For example, the components 414 may include a result of a penetration test, a fuzzing test, an authentication test, or other test of the other systems and services 412. The components 414 may also include audit results or other information obtained from a third party auditor. The results may include compliance information with various security and regulatory standards such as Sarbanes-Oxley, Gramm-Leach-Bliley, Health Insurance Portability and Accountability Act, ISO/IEC 17799, Statement on Auditing Standards No. 70, or other regulatory or security standards. The security service 406, in some embodiments, periodically (e.g., once a month) collects the components 414 from the other systems and services 412. In addition, various events may trigger the security service 406 to collect the components 414 from the other systems and services 412. The triggers include, for example, deprecation of a security algorithm, an update to the API, an update to the components included in the security score, an update to the mechanism used to determine the security score, an update to a policy of the API marketplace, the addition of the API 404 to the API marketplace, or any number of events that may cause a change to the security score for the API 404.

In addition to the components 414, the security service 406 may maintain a set of security controls. The set of security controls may be described or defined in a technical security framework. The set of security controls may define or otherwise be associated with a security policy maintained by the API marketplace or other entity. The security service 406 may determine a security score of a particular API based at least in part on the components 414 for the particular API and the set of security controls. For example, the security service 406 may measure the components 414 conformance to the set of security controls and determine the security score based at least in part on the measured conformance.

The security service 406 may obtain the components 414 by determining the configuration of the other systems and services 412. For example, the security service 406 may determine the SSL requirements for the API 404 based at least in part on the configuration of the computing resources implementing the API 404. Furthermore, the security service 406, for at least a portion of the components 414, may interact with the API 404. For example, the security service 406 submits API calls to computing resources implementing the API 404 to determine the authentication and authorization components. In various embodiments, the developer 402 may provide all or a portion of the components 414. For example, the developer 402 may provide the security service 406 with configuration information and documentation for the API 404. In various embodiments, at least a portion of the components 414 may require an interval of time or a certain amount of time to obtain. For example, historical information, availability information, network logs, and other components 414 may be obtained over a seven day interval.

The security service 406 may maintain a set of security controls which may be used to determine the security score by at least measuring the conformation of the components 414 to the set of security controls. The set of security controls may represent a security policy for various attributes of computing resources implementing a particular API. In one example, the set of security controls may include a key length for SSL, a requirement for authenticating API calls, and an availability requirement for the API 404. The components 414 obtained by the security service 406 may be compared to the set of security controls to generate a security score for the API 404. Various different mechanisms may be used to measure the conformance of the components 414 to a policy and/or set of security controls to determine a security score for the API 404. In addition, certain components may have a greater influence on the security score relative to other components. This may be accomplished by weighting certain components when determining the security score or when determining each components' 414 conformance to the policy and/or set of security controls.

The security service 406 may also determine a metric or other score information indicating the security of the API 404. In some examples, the "score" and/or "metric" may refer to a value that is correlated with a likelihood the particular API will expose a security risk or violate a particular security policy. The score, metric, or other score information may be computed based at least in part on various components described herein. In addition, different components may be assigned different weights when determining the security score. For example, the use of a particular encryption algorithm may be weighted such that it is a greater factor in calculating the security score for the API 404. Other mechanisms for increasing or decreasing the influence of a value or component in a calculation or other determination may be used in accordance with the present disclosure.

The security service 406, after obtaining the components 414 and determining a security score for a particular API based at least in part on the components 414, may generate a report or other information. The report may be provided to the developer associated with the particular API. A level of detail included the report, or a report view, may be configurable. Furthermore, a destination to which the reports and other notifications may be transmitted is configurable as described above. For example, the developer may choose to receive a report only when the security score for the API is below a threshold or may choose a particular level of detail to include in the report if the security score for the API is below a threshold. The security score may be represented as a letter grade, a color status, or numeric value. The report (e.g., the report view) may include only the overall security score, or may include individual composite scores. The report view may include production security scores, experimental security scores, remediation information, a description of one or more security controls, criteria used to determine the security score or composite of the security score, and other information associated with the components 414 and/or security controls. In addition, the reports may be digitally signed by the computing resource service provider 408 or the security service 406. The digital signature allows entities such as consumers of the particular API to validate the authenticity, integrity, and origin of the report.

In various embodiments, the report includes a timestamp indicating when the report was generated and a timestamp indicating when various components were compared to the security controls. As described above, the destination for the report may be determined by the developer and may include websites (including marketplace listings for APIs), an API, a storage service, a WHOIS service, or other endpoint. For example, the developer may cause a report to be provided the WHOIS service including only a number value for the security score but may cause a second report to be provided a storage device associated with the developer including a number value for the security score, a description of one or more security controls, criteria used to determine the security score, and composite of the security score.

The developer may receive notification for a notification service. The notification service may comprise a collection of computing resources collectively configured to provide a web service or other interface and browser-based management console. A management console or other interface can be used to configure topics for which the developer seeks to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service may provide notifications to clients using a "push" mechanism without the need to periodically check or "poll" for new information and updates. The notification service may further be used for various purposes such as monitoring results and security scores generated by the security service 406.

For example, the developer may create a topic for internal use only that causes the notification service to transmit notifications when a security score is determined, the notifications including a report associated with the security score indicating complete details of the components 414 and determination of the security score. The developer may create a second topic for a partner or other entities associated with the developer. Notifications associated with the second topic may include the security score and composite security scores for the API but may exclude remediation information. Furthermore, the second topic may be configured to publish notification at a point in time after determination of the security score to enable the developer to review the information prior to publication. Other delays may be configured by the developer between a point in time when components 414 are obtained, a particular security score is determined, and the security score and information associated with the security score is made available to various endpoints. The developer may also create a third topic for use by anyone that includes only a pass/fail status for the API.

Figure 5:
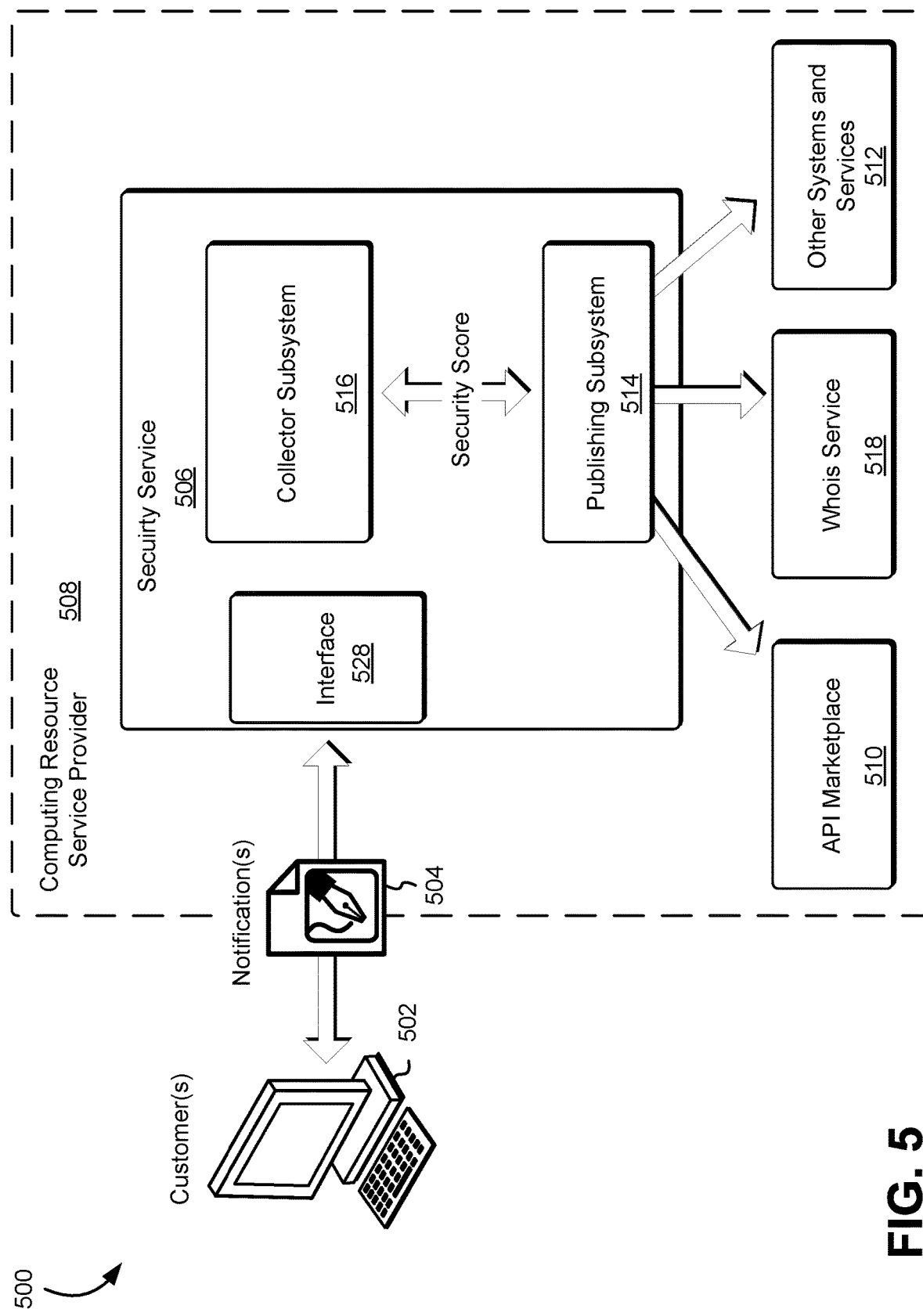
FIG. 5 illustrates an example environment in which a security score for an API may be published to customers by a security service in accordance with an embodiment.

FIG. 5 illustrates an environment 500 in which a security service 506 may publish a security score in accordance with an embodiment. The security service 506 may include an interface 528, collector subsystem 516, and a publishing subsystem 514. The security service 406 may utilize physical computing resources, virtual computing resources, or a combination thereof in order to implement the various systems and subsystems illustrated in FIG. 5. As illustrated, the security service 506 may include an interface 528 for communicating with the customer 502 and providing notifications 504 to the customer. The interface 528 may be a web-services front end executed by a server computer system or other interface as described herein. The interface 528 may enable the customer 502 to receive notification associated with a security score, an API, or other notification as described herein.

The collector subsystem 516 includes computing resource used to collect and obtain components and other information associated with one or more APIs available on an API marketplace 510 as described above. For example, the collector subsystem 516 is a virtual computer system that includes executable instructions, such as source code, that when executed by a processor of the virtual computer system cause the virtual computer system to obtain component information from the other systems and services 512 as described above in connection with FIG. 4. Furthermore, the collector subsystem 516 may determine a security score for a particular API based at least in part on various components obtained by the collector subsystem 516.

The collector subsystem 516, in various embodiments, determines a plurality of security scores for the particular API; the plurality of security scores may be based on the same or different components. For example, the collector subsystem 516 determines a security score for the API marketplace based at least in part on various components including customer rating and/or reviews of the particular API. In another, the collector subsystem 516 may determine a security score for a whois service 518 based at least in part on various components including SSL requirements of the particular API. The collector subsystem 516 may provide one or more security scores associated with various APIs to the publishing subsystem 514 for distribution. The other systems and services 512 may include any systems or services as described herein.

The publishing subsystem 514 is responsible for distributing security scores to various other systems and/or services of the computing resource service provider 508 such as the API marketplace 510, the whois service 518, and the other systems and services 512. In some embodiments, the API marketplace 510, the whois service 518, and the other systems and services 512 are standalone systems and/or services or are part of an entity distinct from the computing resource service provider 508. For example, the API marketplace 510 may be provided by an entity separate from the computing resource service provider 508. The publishing subsystem 514 may include various computing resources used to distribute the security score including various computing resources described herein such as physical computer systems and virtual computer systems. Furthermore, the publishing subsystem 514 may utilize the interface 528 or other interfaces to distribute the security score. For example, the publishing subsystem 514 may distribute the security score through appropriately configured API calls including the security score.

The whois service 518 includes computing resources executing the WHOIS protocol. The whois service 518 may provide a mechanism for customers to query and receive response in accordance with the WHOIS protocol. For example, the whois service 518 includes a database or other data store which maintains information associated with registered users or assignees of an Internet resource, such as a domain name, an Internet Protocol (IP) address block, an API system, or other information. The WHOIS protocol is documented in RFC 3912 which is hereby incorporated by reference as if it were set forth in its entirety herein. Furthermore, the whois service 518 may maintain a security score for one or more records included in the whois service 518. For example, the customer 502 may query the whois service 518 for a security score or other security information associated with a particular API. The whois service 518 may present the information in response to received queries in a human readable manner.

Furthermore, the whois service 518 may enable customers and/or developers to obtain a ".SECURE" top-level domain for certain APIs. For example, if a particular API obtains a minimum security score the whois service 518 may enable the developer of the API to obtain a .SECURE top-level domain name. In addition, the whois service 518 may require a minimum score for different security scores and/or subscores. For example as described above, a plurality of security scores based at least in part on different components may be calculated for various APIs. Therefore, the whois service 518 may require that all or a portion of the different security scores for a particular API exceed a certain threshold value or score in order to qualify for the .SECURE top-level domain. The .SECURE top-level domain may be one of the domains at the highest level in the hierarchical Domain Name System (DNS) of the Internet. The .SECURE top-level domain may be implemented at the root zone of the name space (e.g., the highest level of a hierarchical system). For example, in the domain name www.example.secure, the top-level domain is secure. This may indicate to customers that the particular API meets certain security standards and/or indicates a security score associated with the API.

Figure 6:
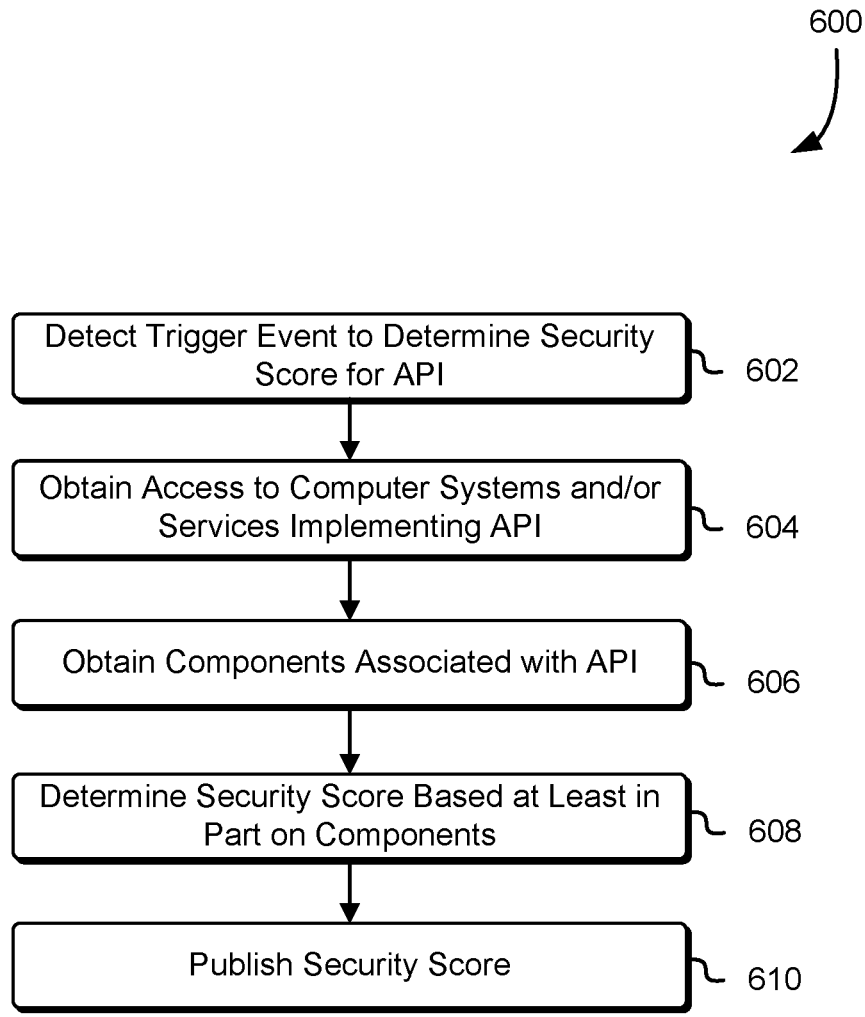
FIG. 6 illustrates a process for determining a security score for an API and providing customers with the security score with an embodiment.

FIG. 6 shows an illustrative example of the process 600 which may be used to determine a security score associated with an API offered for consumption for an API marketplace and publishing the security score in accordance with an embodiment. The process 600 may be performed by any suitable system such as a security service or subsystem thereof as described above in connection with FIG. 5. Returning to FIG. 6, in an embodiment, the process 600 includes detecting a trigger event causing the security service to determine a security score for an API 602. The event may include a variety of events as described above, such as expiration of an interval of time, customer request, modification of the API, modification of a security policy associated with the API marketplace, or other trigger event that may require the security service to determine a security score for the API. In addition, the developer of the API or other entity associated with the API may be notified that a security score will be determined for the API and a result of determining the new security score. For example, if the API marketplace modifies the security policy for APIs offered from consumption on the API marketplace, the developer of a particular API may be notified of the update and the result of determining a security score associated with the particular API including the modified security policy so that the developer may, if they chose, modify the API in response.

Returning to FIG. 6, the security service may then obtain access to the computer systems and/or services implementing the API. Obtaining access to the computer systems and/or services implementing the API may include transmitting queries to the computer systems and/or services implementing the API for information associated with the API. In another example, this may include obtaining access credentials or assuming a role associated with the computer systems and/or services implementing the API to obtain configuration information associated with the API as described above. The security service may then obtain components associated with the API. The components may include a variety of information as described above including configuration information, network information, encryption information, availability information, WHOIS information, DNS information, SSL information, TLS information, and other information associated with the API. The security service may obtain the components using a variety of mechanisms as described above. For example, the security service may request configuration information for one or more services of a computing resource service provider utilized by the developer of the API to implement the API. In another example, the security service may execute various test and/or operations associated with the API to obtain the component information.

The security service may then determine a security score based at least in part on the components 608. The security score may be determined using various techniques as described herein. For example, the components may be compared to a security policy to determine conformance with the security policy. In another example, a value may be associated with the components based at least in part on a rule set or policy. In addition, multiple security scores may be determined or a single security score may be broken down or otherwise subdivided in to multiple subscores. For example, the components may be organized into a set of production components and a set of experimental components and a security score may be calculated for each set of components. The set of experimental components may include components or means of measuring a value associated with a component for which its effect on the security score or value within the security score is at least partially unknown. For example, it may be unknown how valuable a customer or consumer of an API considers various components and, therefore, the components may be included in the set of experimental components.

The security service may then publish the security score 610. Publishing the security score may include providing the security score to the API marketplace or other endpoint such as a whois service or a customer as described above. All or a portion of the security scores determined by the security service may be published. For example, a security score determined based at least in part on components considered experimental may not be published. In addition, the security score may first be provided to the developer of the API prior to publication on the API marketplace. This may provide the developer with a grace period to modify the implementation of the API and increase the security score before it is published on the API marketplace. Furthermore, the security score may be published or otherwise provided to a data store responsible for maintaining historical information associated with the API. This historical information may be used to determine the security score and/or provided to customers.

In numerous variations to the process 600, the access to the computer systems and services implementing the API may be provided prior to the execution of the process 600. For example, a developer of the API may provide the security service with credentials for accessing the computer systems and services implementing the API prior to the trigger event. Additionally, step 604 may be omitted from the process 600 entirely. For example, the security service may obtain the components associated with the API from a third party such as the developer or other computer systems and services not implementing the API. In yet other variations to the process 600, the security service may conduct various tests, such as a network penetration test, to obtain the components associated with the API.

Figure 7:
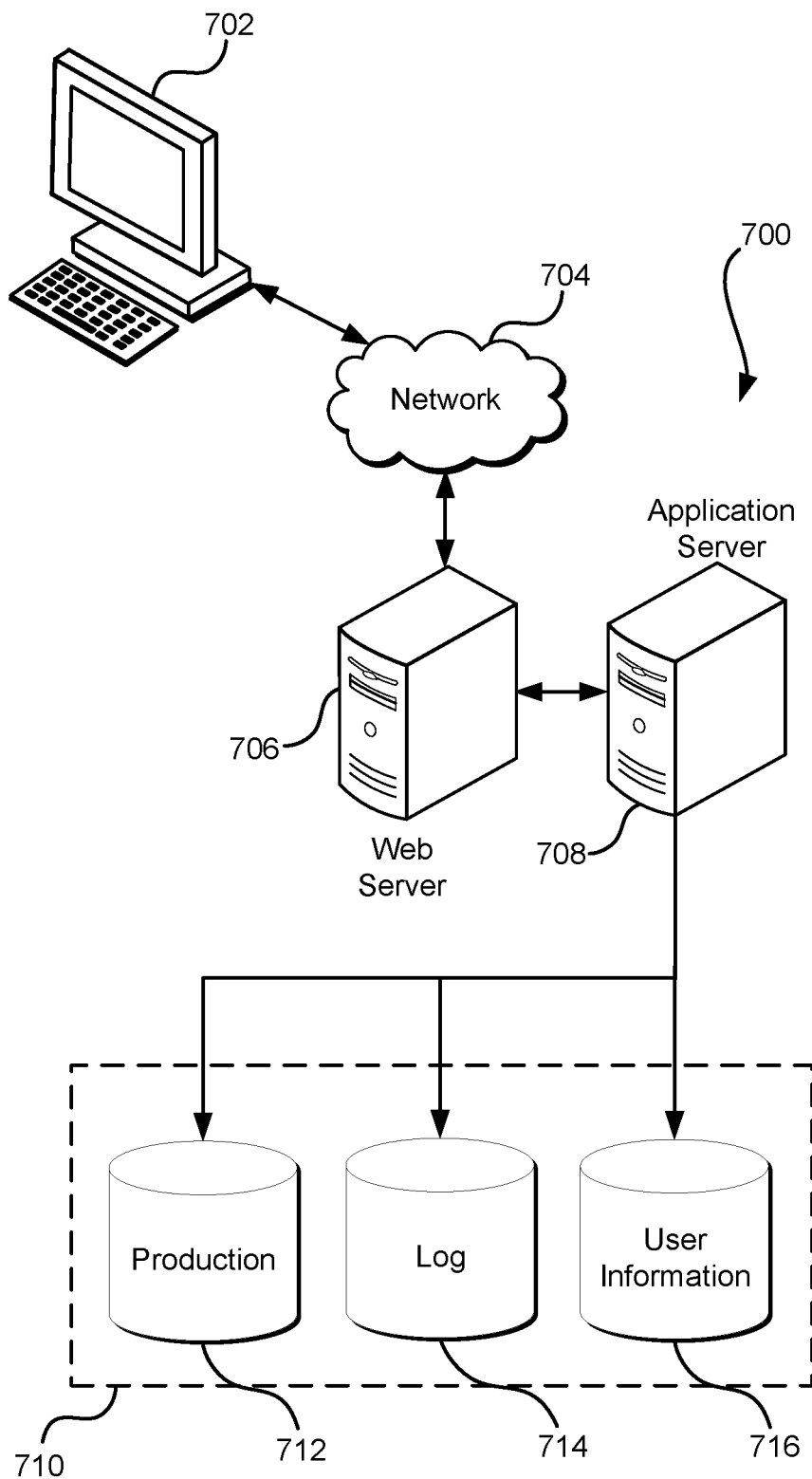
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   detecting a trigger event indicating that a security score is to be determined for an application program interface, and wherein the application program interface is made available for consumption by a computing resource service provider;
   obtaining responses from a set of computing resources implementing the application program interface by at least invoking the application program interface;
   analyzing the responses to obtain a set of components of the security score, the set of components indicating configuration information and security information associated with the set of computing resources;
   determining the security score based at least in part on the set of components by at least comparing the set of components of the security score to a security policy maintained by the computing resource service provider; and
   publishing the security score to the computing resource service provider that makes the application program interface available for consumption.

2. The computer-implemented method of claim 1, wherein determining the security score comprises determining the set of components' conformance to the security policy and applying a weight to at least a subset of the set of components to increase an influence of the subset of the set of components on the security score.

3. The computer-implemented method of claim 1, wherein the trigger event comprises an expiration of an interval of time.

4. The computer-implemented method of claim 1, wherein the trigger event comprises a request from a client device operated by a developer to add the application program interface to the computer system that makes accessible application programming interfaces for selection and download.

5. A system, comprising:
   one or more processors; and
   memory with executable instructions that, as a result of being executed by the one or more processors, cause the system to:
     determine a security score associated with an application program interface by at least:
       detecting a trigger indicating the security score is to be determined for the application program interface;
       obtaining a set of components of the security score from a set of computing systems executing at least a portion of the application program interface, the set of components including information obtained at least in part on responses to calls to the application program interface executed by the set of computing systems; and
       determining the security score based at least in part on the set of components; and
     publish the security score to one or more endpoints.

6. The system of claim 5, wherein the memory further includes instructions that, as a result of being executed by the one or more processors, cause the system to obtain access to the set of computing systems.

7. The system of claim 6, wherein the instructions that cause the system to obtain access to the set of computing systems further include instructions that, as a result of being executed by the one or more processors, cause the system to obtain access by at least assuming a role provided by a developer of the application program interface.

8. The system of claim 5, wherein the instructions that cause the system to determine the security score further include instructions that, as a result of being executed by the one or more processors, cause the system to determine the security score by at least comparing the set of components to a set of security controls.

9. The system of claim 8, wherein the instructions that cause the system to detect the trigger further include instructions that, as a result of being executed by the one or more processors, cause the system to detect the trigger based at least in part on an update to the set of security controls.

10. The system of claim 9, wherein the memory further includes instructions that, as a result of being executed by the one or more processors, cause the system to transmit a notification to a developer associated with the application program interface indicating the update to the set of security controls and the security score.

11. The system of claim 5, wherein the instructions that cause the system to publish the security score further include instructions that, as a result of being executed by the one or more processors, cause the system to provide the security score to a whois service.

12. The system of claim 5, wherein the memory further includes instructions that, as a result of being executed by the one or more processors, cause the system to provide, to a developer associated with the application program interface, an ability to register a particular top-level domain name based at least in part on the security score associated with the application program interface being above a threshold.

13. A non-transitory computer-readable storage medium comprising executable instructions that, as a result of being executed by one or more processors of a computer system, cause the computer system to at least:
- obtain a component of a security score associated with an application program interface, the application program interface available for consumption through an interface provided by at least one other computer system, the component indicating information associated with a response to an invocation of the application program interface;
- determine the security score for the application program interface based at least in part on conformation of the component to a security policy; and
- provide the security score to the at least one other computer system.

14. The non-transitory computer-readable storage medium of claim 13, wherein the instructions further comprise instructions that, as a result of being executed by the one or more processors, cause the computer system to:
- obtain an additional component indicating information associated with the set of computing resources implementing the application program interface; and
- determine a second security score based at least in part on the component and the additional component.

15. The non-transitory computer-readable storage medium of claim 13, wherein the instructions that cause the computer system to obtain the component further include instructions that cause the computer system to obtain encryption configuration information of the computing resource.

16. The non-transitory computer-readable storage medium of claim 13, wherein the instructions that cause the computer system to obtain the component further include instructions that cause the computer system to obtain network traffic flow information associated with the computing resource.

17. The non-transitory computer-readable storage medium of claim 13, wherein the instructions that cause the computer system to obtain the component further include instructions that cause the computer system to obtain a result of a test operation performed on the computing resource.

18. The non-transitory computer-readable storage medium of claim 13, wherein the instructions that cause the computer system to obtain the component further include instructions that cause the computer system to obtain information associated with the application program interface from a developer of the application program interface.

19. The non-transitory computer-readable storage medium of claim 13, wherein the instructions that cause the computer system to determine the security score further include instructions that cause the computer system to determine the security score as a result of a change to a configuration of the set of computing resources implementing the application program interface.

20. The non-transitory computer-readable storage medium of claim 13, wherein the instructions that cause the computer system to obtain the component further include instructions that cause the computer system to obtain the component from a service of a computing resource service provider, the service providing a subset of the set of computing resources implementing the application program interface.

21. The non-transitory computer-readable storage medium of claim 13, wherein the instructions that cause the computer system to determine the security score further include instructions that cause the computer system to determine the security score as a result of a request from a developer associated with the application program interface.

22. The non-transitory computer-readable storage medium of claim 13, wherein the instructions that cause the computer system to obtain the component further include instructions that cause the computer system to obtain compliance information from a third party auditor.

23. The non-transitory computer-readable storage medium of claim 13, wherein the instructions further comprise instructions that, as a result of being executed by the one or more processors, cause the computer system to obtain, from a developer associated with the application program interface, notification information indicating a level of detail and endpoint for a report associated with the security score.

* * * * *